(12) United States Patent
Bottazzi

(10) Patent No.: US 10,701,515 B2
(45) Date of Patent: Jun. 30, 2020

(54) MULTI-BEACON-BASED LOCATION SYSTEM AND METHOD

(71) Applicant: DATALOGIC IP TECH S.r.l., Bologna (IT)

(72) Inventor: Marco Bottazzi, Ferrara (IT)

(73) Assignee: DATALOGIC IP TECH S.r.l., Bologna (IT)

(*) Notice: Subject to any disclaimer, the term of this patent is extended or adjusted under 35 U.S.C. 154(b) by 0 days.

(21) Appl. No.: 16/060,894

(22) PCT Filed: Dec. 10, 2015

(86) PCT No.: PCT/IT2015/000302
§ 371 (c)(1),
(2) Date: Jun. 8, 2018

(87) PCT Pub. No.: WO2017/098534
PCT Pub. Date: Jun. 15, 2017

(65) Prior Publication Data
US 2018/0367948 A1    Dec. 20, 2018

(51) Int. Cl.
*H04W 4/02* (2018.01)
*H04W 4/80* (2018.01)
(Continued)

(52) U.S. Cl.
CPC .............. *H04W 4/023* (2013.01); *G01S 1/042* (2013.01); *G01S 1/045* (2013.01); *G01S 1/08* (2013.01);
(Continued)

(58) Field of Classification Search
CPC ....... H04W 4/023; H04W 64/00; H04W 4/80; H04W 40/244; H04W 4/029; H04W 4/04; G01S 5/0215; G01S 3/46; G01S 5/02; G01S 5/0226; H04B 7/04; H04B 17/318
See application file for complete search history.

(56) References Cited

U.S. PATENT DOCUMENTS 8,040,280 B2    10/2011  Seong et al.
8,712,690 B1    4/2014   White et al.
(Continued)

FOREIGN PATENT DOCUMENTS

WO    2012175352 A1    12/2012
WO    2014055294 A1    4/2014

OTHER PUBLICATIONS

Faragher et al., "Location Fingerprinting with Bluetooth Low Energy Beacons", *IEEE Journal on Selected Areas in Communications*, vol. 33, No. 11, Nov. 2015, 11 pages.
(Continued)

*Primary Examiner* — Quoc Thai N Vu
(74) *Attorney, Agent, or Firm* — Cozen O'Connor

(57) ABSTRACT

Systems and methods for providing improved accuracy for beacon-based location systems. A location estimation system may include a multi-beacon system which includes two or more beacons positioned proximate each other. The beacons emit correlated beacon frames which are time and data correlated. A mobile device receives the beacon signals and processes them to estimate the distance between the mobile device and the multi-beacon system. The mobile device processes the signals based on a correlation function of the beacons signal strength trends, which indicates homogeneity and reliability of the acquired signals. When the correlation is high, the two or more RSSI signals are stable and may be used for the distance estimation. When the correlation is low, at least one of the signals is irregular. The mobile device compensates for the irregular signal, thus improving distance estimation accuracy.

20 Claims, 7 Drawing Sheets

(51) Int. Cl.

| | |
|---|---|
| *G01S 1/08* | (2006.01) |
| *G01S 1/04* | (2006.01) |
| *G01S 11/06* | (2006.01) |
| *H04B 17/318* | (2015.01) |
| *G01S 5/02* | (2010.01) |

(52) U.S. Cl.
CPC .......... *G01S 5/0215* (2013.01); *G01S 5/0226* (2013.01); *G01S 11/06* (2013.01); *H04B 17/318* (2015.01); *H04W 4/80* (2018.02); *G01S 5/0273* (2013.01)

(56) References Cited

U.S. PATENT DOCUMENTS

| | | | |
|---|---|---|---|
| 8,862,067 B2 | 10/2014 | Un et al. | |
| 2006/0164320 A1* | 7/2006 | Lastinger | H01Q 1/246 |
| | | | 343/893 |
| 2006/0232467 A1* | 10/2006 | Small | G01S 5/021 |
| | | | 342/357.63 |
| 2013/0115969 A1* | 5/2013 | Holmes | H04W 4/04 |
| | | | 455/456.1 |
| 2014/0111380 A1 | 4/2014 | Gibbs et al. | |
| 2014/0370917 A1 | 12/2014 | Buchheim et al. | |
| 2015/0181384 A1 | 6/2015 | Mayor et al. | |
| 2015/0296476 A1 | 10/2015 | Wilmhoff et al. | |
| 2017/0006422 A1* | 1/2017 | Kim | G01S 11/16 |

OTHER PUBLICATIONS

International Search Report, dated Sep. 27, 2016, for PCT/IT2015/000302, 6 pages.

Written Opinion, dated Sep. 27, 2016, for PCT/IT2015/000302, 8 pages.

\* cited by examiner

MULTI-BEACON-BASED LOCATION SYSTEM AND METHOD

BACKGROUND

Technical Field

The present disclosure generally relates to beacon-based range estimation for mobile electronic devices.

Description of the Related Art

Retailers are constantly searching for new ways to enhance a customer's shopping experience, increase the customer's satisfaction and promote customer loyalty. Self-shopping enables retailers to introduce technology that improves sales and cuts costs by allowing customers to take charge of their own shopping and enjoy the experience. Self-shopping solutions enable shoppers to obtain the information they need without the help of a store associate by accessing in-store devices, displays and kiosks. In some instances, the customer may obtain this information directly on a custom mobile processor-based device or on their own personal device (e.g., smartphone, tablet) while the customer is inside or outside of the store.

Some of the offerings include applications that enable mobile shopping, product location, price confirmation, gift registry and self-checkout. All of this functionality may be accessible through an in-store communications system (e.g., Wi-Fi®, Bluetooth®), which allows shoppers to receive specific store or product information as well as in-store promotions.

One of the benefits of self-shopping is a fast checkout process which allows the customer to "pre-scan" the items they are purchasing with a portable device (such as a custom self-shopping device or a smartphone) before they approach the register. For example, customers may point a machine-readable symbol reader of a portable device at a product machine-readable symbol (e.g., barcode) and click on a button to scan the symbol, which then shows a description and the price of the product on a display of the portable device. While shopping, customers may also be able to check a list of all products previously scanned and may have access to an up-to-date total of their purchases, additional store offers, promotions and discounts. When a customer's shopping is completed, they simply go to the checkout and pay using self-payment kiosks without having to remove any of the merchandise from the cart or bag. This reduces waiting times considerably.

In self-shopping environments, it is often desirable to track the location of customers as they move through a store or shopping center. For example, it may be desirable to provide customers with directions to products, or to provide customers with information or promotions relating to products that are located nearby. Generally, available spatial location technologies are characterized by different performance factors, such as accuracy, range, passive/active behavior, etc. Each technology may have its own advantages and drawbacks that may match the requirements of a particular application.

Estimating range between devices may be of particular interest for applications that require two or more devices to be in close proximity to communicate (e.g., perform transactions). There are several radio frequency (RF) technologies available that can be used to estimate range. These technologies include but are not limited Wi-Fi®, Bluetooth® Low Energy (BLE), and Near Field Communication (NFC). Since these RF technologies were not designed for ranging services only, these RF technologies have parasitic effects (e.g., multipath interference) which may undesirably limit the ability of these RF technologies to estimate range.

BRIEF SUMMARY

A mobile processor-based device may be summarized as including a radio frequency (RF) receiver; at least one nontransitory processor-readable storage medium that stores at least one of processor-executable instructions or data; and at least one processor communicably coupled to the at least one nontransitory processor-readable storage medium and communicatively coupled to the RF receiver, in operation the at least one processor: receives, via the RF receiver, a first RF signal from a first RF transmitter of a multi-beacon system, the first RF signal having a wavelength between a minimum wavelength and a maximum wavelength; receives, via the RF receiver, a second RF signal from a second RF transmitter of the multi-beacon system, the second RF signal having a wavelength between the minimum wavelength and the maximum wavelength, the second RF transmitter spaced apart from the first RF transmitter by a distance which is equal to or greater than the maximum wavelength and less than or equal to four times the maximum wavelength, the first and second RF signals received concurrently from the respective first and second RF transmitters, and each of the first and second RF signals modulated to allow the RF receiver to receive each of the first and second RF signals independently without interference from one another; monitors a trend of signal strengths for each of the received first and second RF signals; correlates the trends of the signal strengths of the received first and second RF signals; and estimates a distance between the mobile processor-based device and the multi-beacon system based at least in part on the correlation of the trends of the signal strengths of the received first and second RF signals.

Responsive to the correlation being greater than a correlation threshold value, the at least one processor of the mobile processor-based device may estimate a distance between the mobile processor-based device and the multi-beacon system based at least in part on one of: the trend of signal strengths for the received first RF signal, the trend of signal strengths for the received second RF signal, an average of the trend of signal strengths for the received first RF signal and the trend of signal strengths for the received second RF signal, or a median of the trend of signal strengths for the received first RF signal and the trend of signal strengths for the received second RF signal.

Responsive to the correlation being less than the correlation threshold value, the at least one processor of the mobile processor-based device may determine which of the received first and second RF signals causes the correlation to be less than the correlation threshold value, and responsive to the determination, may ignore signal strengths determined to cause the correlation to be less than the correlation threshold value from the respective trend of signal strengths for the first and second RF signals.

Responsive to the correlation being less than a correlation threshold value, the at least one processor of the mobile processor-based device may determine which of the received first and second RF signals causes the correlation to be less than the correlation threshold value, and responsive to the determination, may de-weight signal strengths determined to cause the correlation to be less than the correlation threshold value from the respective trend of signal strengths for the first and second RF signals. The at least one processor of the mobile processor-based device may monitor a trend of received signal strength indicators (RSSIs) for each of the received first and second RF signals.

The at least one processor of the mobile processor-based device may monitor a trend of signal strengths for each of the received first and second RF signals, each of the trends of signal strengths including a running average of a plurality of signal strengths.

A multi-beacon system may be summarized as including a first radio frequency (RF) transmitter which transmits RF signals having wavelengths between a minimum wavelength and a maximum wavelength; a second RF transmitter which transmits RF signals having wavelengths between the minimum wavelength and the maximum wavelength, the second RF transmitter spaced apart from the first RF transmitter by a distance which is equal to or greater than the maximum wavelength and less than or equal to four times the maximum wavelength; at least one nontransitory processor-readable storage medium that stores at least one of processor-executable instructions or data; and at least one processor communicably coupled to the at least one nontransitory processor-readable storage medium and communicatively coupled to the first and second RF transmitters, in operation the at least one processor: causes each of the first and second RF transmitters to concurrently transmit respective first and second RF signals, each of the first and second RF signals modulated to permit at least one processor of a mobile processor-based device to receive each of the first and second RF signals independently without interference from one another, and the transmission of the first and second RF signals causes at least one processor of a mobile processor device located proximate to the multi-beacon system to correlate trends of the signal strengths of the received first and second RF signals to estimate a distance between the mobile processor-based device and the multi-beacon system. The multi-beacon system may include first and second independent beacons, the first RF transmitter may be an RF transmitter of the first independent beacon having a first nontransitory processor-readable storage medium and a first processor communicatively coupled to the first nontransitory processor-readable medium and the first RF transmitter, and the second RF transmitter may be an RF transmitter of the second independent beacon having a second nontransitory processor-readable storage medium and a second processor communicatively coupled to the second nontransitory processor-readable medium and the second RF transmitter. The maximum wavelength may be 12.5 centimeters, and the second RF transmitter may be spaced apart from the first RF transmitter by a distance which may be equal to or greater than 12.5 centimeters and less than or equal to 50 centimeters. The maximum wavelength may be 12.5 centimeters, and the second RF transmitter may be spaced apart from the first RF transmitter by a distance which may be equal to or greater than 25 centimeters and less than or equal to 35 centimeters. The at least one processor of the multi-beacon system may cause each of the first and second RF transmitters to transmit each of the respective first and second RF signals using an advertising mode of a wireless communications protocol. The at least one processor of the multi-beacon system may cause the first RF transmitter to transmit the first RF signal on a first channel of a wireless communications protocol and may cause the second RF transmitter to transmit the second RF signal on a second channel of the wireless communications protocol, the second channel different from the first channel. The at least one processor of the multi-beacon system may cause the first RF transmitter to transmit the first RF signal which may be implemented as odd data and may cause the second RF transmitter to transmit the second RF signal which may be implemented as even data. The multi-beacon system may include a support structure which physically supports the first RF transmitter and the second RF transmitter. The multi-beacon system may include a first support structure which physically supports the first RF transmitter, and a second support structure which physically supports the second RF transmitter. Each of the first and second RF signals may be modulated to include unique identifying information and signal strength information.

A location estimation system for facilitating location estimation of a mobile processor-based device may be summarized as including a multi-beacon system, including: a first radio frequency (RF) transmitter which transmits RF signals having wavelengths between a minimum wavelength and a maximum wavelength; a second RF transmitter which transmits RF signals having wavelengths between the minimum wavelength and the maximum wavelength, the second RF transmitter spaced apart from the first RF transmitter by a distance which is equal to or greater than the maximum wavelength and less than or equal to four times the maximum wavelength; at least one nontransitory processor-readable storage medium that stores at least one of processor-executable instructions or data; and at least one processor communicably coupled to the at least one nontransitory processor-readable storage medium and communicatively coupled to the first and second RF transmitters, in operation the at least one processor: causes each of the first and second RF transmitters to concurrently transmit respective first and second RF signals, each of the first and second RF signals modulated to permit a mobile processor-based device to receive each of the first and second RF signals independently without interference from one another; and a mobile processor-based device, including: an RF receiver; at least one nontransitory processor-readable storage medium that stores at least one of processor-executable instructions or data; and at least one processor communicably coupled to the at least one nontransitory processor-readable storage medium and communicatively coupled to the RF receiver, in operation the at least one processor: receives, via the RF receiver, the first and second RF signals from the respective first and second RF transmitters of the multi-beacon system; monitors a trend of signal strengths for each of the received first and second RF signals; correlates the trends of the signal strengths of the received first and second RF signals; and estimates a distance between the mobile processor-based device and the multi-beacon system based at least in part on the correlation of the trends of the signal strengths of the received first and second RF signals.

The multi-beacon system may include first and second independent beacons, the first RF transmitter may be an RF transmitter of the first independent beacon having a first nontransitory processor-readable storage medium and a first processor communicatively coupled to the first nontransitory processor-readable medium and the first RF transmitter, and the second RF transmitter may be an RF transmitter of the second independent beacon having a second nontransitory processor-readable storage medium and a second processor communicatively coupled to the second nontransitory processor-readable medium and the second RF transmitter. Responsive to the correlation being greater than a correlation threshold value, the at least one processor of the mobile processor-based device may estimate a distance between the mobile processor-based device and the multi-beacon system based at least in part on one of: the trend of signal strengths for the received first RF signal, the trend of signal strengths for the received second RF signal, an average of the trend of signal strengths for the received first RF signal and the trend of signal strengths for the received second RF signal, or a median of the trend of signal strengths for the received first RF signal and the trend of signal strengths for the received second RF signal. Responsive to the correlation being less than the correlation threshold value, the at least one processor of the mobile processor-based device may determine which of the received first and second RF signals causes the correlation to be less than the correlation threshold value, and responsive to the determination, may ignore signal strengths determined to cause the correlation to be less than the correlation threshold value from the respective trend of signal strengths for the first and second RF signals. Responsive to the correlation being less than a correlation threshold value, the at least one processor of the mobile processor-based device may determine which of the received first and second RF signals causes the correlation to be less than the correlation threshold value, and responsive to the determination, may de-weight signal strengths determined to cause the correlation to be less than the correlation threshold value from the respective trend of signal strengths for the first and second RF signals. The maximum wavelength may be 12.5 centimeters, and the second RF transmitter may be spaced apart from the first RF transmitter by a distance which may be equal to or greater than 12.5 centimeters and less than or equal to 50 centimeters. The maximum wavelength may be 12.5 centimeters, and the second RF transmitter may be spaced apart from the first RF transmitter by a distance which may be equal to or greater than 25 centimeters and less than or equal to 35 centimeters. The at least one processor of the multi-beacon system may cause each of the first and second RF transmitters to transmit each of the respective first and second RF signals using an advertising mode of a wireless communications protocol. The at least one processor of the multi-beacon system may cause the first RF transmitter to transmit the first RF signal on a first channel of a wireless communications protocol and may cause the second RF transmitter to transmit the second RF signal on a second channel of the wireless communications protocol, the second channel different from the first channel. The at least one processor of the multi-beacon system may cause the first RF transmitter to transmit the first RF signal which is implemented as odd data and causes the second RF transmitter to transmit the second RF signal which is implemented as even data. The multi-beacon system may include a support structure which physically supports the first RF transmitter and the second RF transmitter. The multi-beacon system may include a first support structure which physically supports the first RF transmitter, and a second support structure which physically supports the second RF transmitter. The at least one processor of the mobile processor-based device may monitor a trend of received signal strength indicators (RSSIs) for each of the received first and second RF signals. Each of the first and second RF signals may be modulated to include unique identifying information and signal strength information. The at least one processor of the mobile processor-based device may monitor a trend of signal strengths for each of the received first and second RF signals, each of the trends of signal strengths including a running average of a plurality of signal strengths.

A method of operation of a multi-beacon system, the multi-beacon system including a first radio frequency (RF) transmitter which transmits RF signals having wavelengths between a minimum wavelength and a maximum wavelength; a second RF transmitter which transmits RF signals having wavelengths between the minimum wavelength and the maximum wavelength, the second RF transmitter spaced apart from the first RF transmitter by a distance which is equal to or greater than the maximum wavelength and less than or equal to four times the maximum wavelength, at least one nontransitory processor-readable storage medium that stores at least one of processor-executable instructions or data, and at least one processor communicably coupled to the at least one nontransitory processor-readable storage medium and communicatively coupled to the first and second RF transmitters, which may be summarized as including causing, by the at least one processor, each of the first and second RF transmitters to concurrently transmit respective first and second RF signals, each of the first and second RF signals modulated to permit at least one processor of a mobile processor-based device to receive each of the first and second RF signals independently without interference from one another, and the transmission of the first and second RF signals causes at least one processor of a mobile processor device located proximate to the multi-beacon system to correlate trends of the signal strengths of the received first and second RF signals to estimate a distance between the mobile processor-based device and the multi-beacon system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
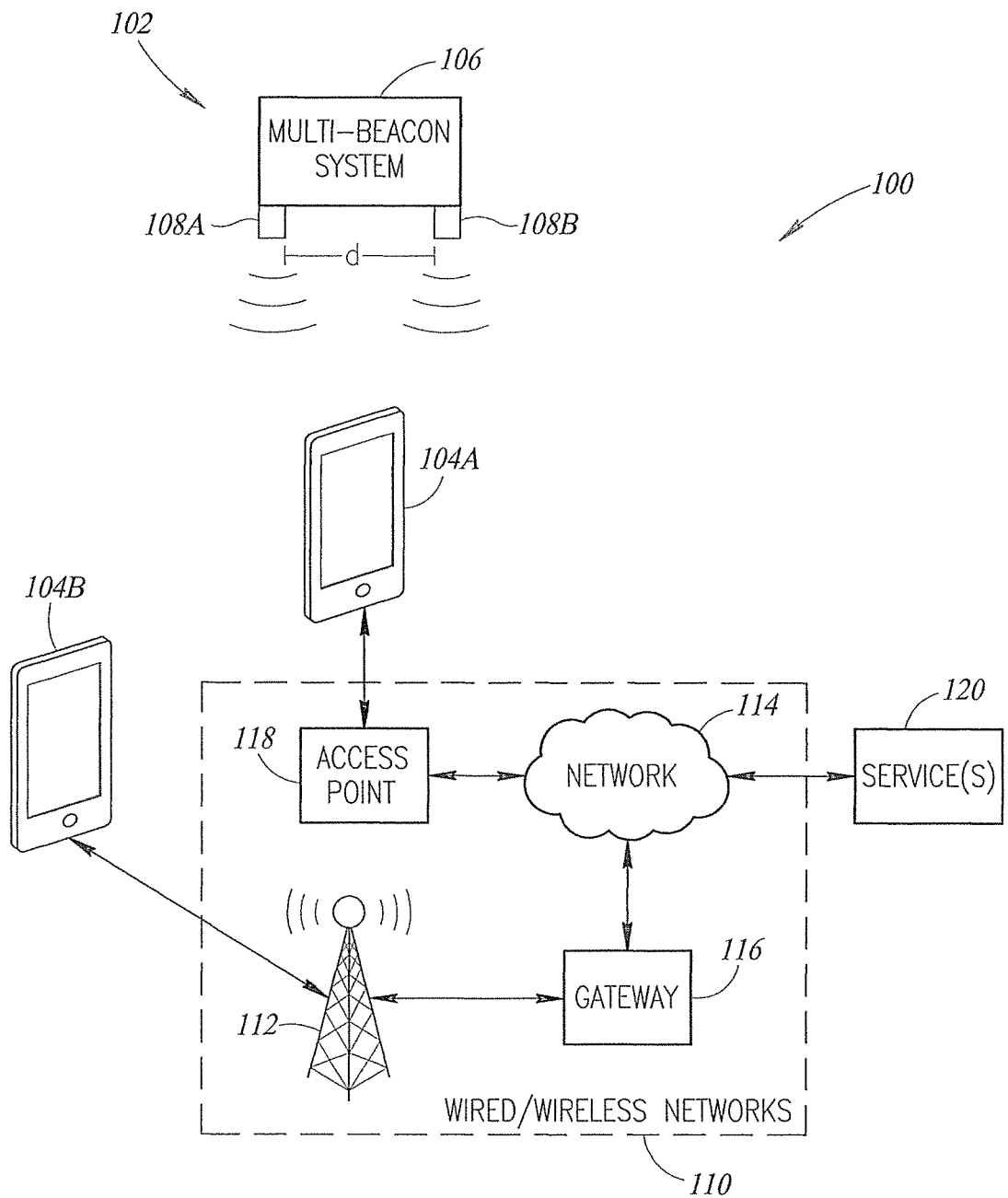
FIG. 1 is a schematic diagram of an example operating environment for a location estimation system which includes a multi-beacon system and a mobile processor-based device which processes beacon signals received from the multi-beacon system to estimate a distance between the mobile processor-based device and the multi-beacon system, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods which provide improved location estimation capabilities for beacon-based location systems. Generally, the accuracy of range estimation (i.e., estimation of the distance between a beacon and a mobile processor-based device) may be strongly affected by the behavior of the strength of the beacon signal received by an RF receiver of the mobile processor-based device ("receiver signal strength"), which depends on the propagation rules and morphology of the surrounding environment.

One physical phenomenon which affects the received signal strength is multipath, which is the propagation phenomenon that results in beacon signals reaching the receiving antenna of the mobile processor-based device by two or more different paths. Causes of multipath include atmospheric ducting, ionospheric reflection and refraction, and reflection from water and/or objects (e.g., walls, ceiling, furniture). Because of multipath, the receiver sees the superposition of multiple copies of the transmitted signal, each traversing a different path. Each signal copy will experience differences in attenuation, delay and phase shift while travelling from the beacon to the receiver of the mobile processor-based device. This can result in either constructive or destructive interference, amplifying or attenuating the signal power (e.g., received signal strength indicator (RSSI)) seen at the receiver, which causes "peaks" and "valleys" in the signal power which do not correspond to actual changes in distance between the transmitter and receiver.

The multipath fading effect may cause false alarms ("front back errors") in beacon proximity location systems. Being longer than the direct line of sight (LOS) path, the delayed non-LOS signals interfere with the LOS signal in a destructive way, producing drops in the RSSI received signal strength, or in a constructive way generating peaks in the RSSI. Both effects generate errors in the distance evaluation performed by the mobile processor-based device which receives the beacon.

Typically, a beacon system which works in advertising mode emits a beacon signal into the surrounding environment. This beacon signal is received from one or more mobile processor-based devices that acquire the beacon signal and process the signal to estimate the distance between the mobile processor-based device and the beacon system based on the received signal strength of the signal. The beacon signal may reach the mobile processor-based device following an LOS path, which is the best possibility, but beacon signals which follow different paths may also be summed with the signal that follows the LOS path. The different phase resulting from different paths cause fluctuations on the resulting RSSI signals which may be erroneously interpreted by the mobile processor-based device as fluctuations in the distance between the mobile processor based-device and the beacon system.

Generally, the distance between a mobile processor-based device and the multi-beacon system may be determined by calculating the difference between the transmit power of one or more of the signals, as indicated in the transmission, and the received strength of those signals as determined by the mobile processor-based device receiving those signals. The difference may be calculated by determining the decrease in signal strength of one or more of the signals and determining a distance based on the decrease and known loss characteristics through the medium.

As discussed further below, to overcome at least some of the aforementioned issues which reduce accuracy, implementations of the present disclosure introduce diversity by using two or more beacon systems, collectively referred to herein a dual-beacon systems or multi-beacon systems, which represent an anchor node in a beacon system. The multi-beacon system may transmit two different but correlated beacon signals to mobile processor-based devices located proximate the multi-beacon system. As an example, each beacon of the multi-beacon system may operate in advertising mode as in a traditional beacon system.

The two (or more) beacon signals emitted by the two beacons of the multi-beacon system should be correlated for a proper analysis to be performed by the mobile processor-based device which receives the signals. Such correlation may be based on two points, for example. First, the two beacon signals should be correlated in time and space. That is, the transmission time is the similar or identical for both of the two beacon signals and the two beacons of the multi-beacon system are physically located close one to the other. Thus, the two beacons are close enough to each other so that their respective beacons signals are correlated and the distance between each of the beacons and the mobile processor-based device is similar, but spaced far enough apart from each other so that multipath effects are decorrelated. For example, the two beacons of the multi-beacon system may be spaced apart from each other by a distance which is equal to or greater than a maximum wavelength ($\lambda_{max}$) of the beacon signal and less than or equal four times the maximum wavelength of the beacon signal. Continuing with this example, for BLE beacon signals having a maximum wavelength ($\lambda_{max}$) of 12.5 cm, the two beacons of the multi-beacon system may be spaced apart from each other by a distance of between 12.5 cm and 50 cm.

Second, the beacon messages of the two beacon signals should be intrinsically correlated with each other. For example, taking in consideration the Apple iBeacon®, the beacon frames of the two beacon signals may be differentiated by implementing the minor number of one of the beacon signals as odd data and implementing the minor number of the other of the beacon signals as even data, while the major number and the unique identifiers of the two beacon signals are identical. The two beacon signals may also be transmitted on different channels so that the RF receiver of the mobile processor-based device can concurrently receive both of the beacon signals without interference from each other.

In some implementations, the mobile processor-based device concurrently receives two beacon signals from the two beacons of the multi-beacon system. The mobile processor-based device may determine an average or median of the RSSIs of the two beacon signals, and use such average or median RSSI to estimate the distance between the mobile processor-based device and the multi-beacon system.

Figure 6:
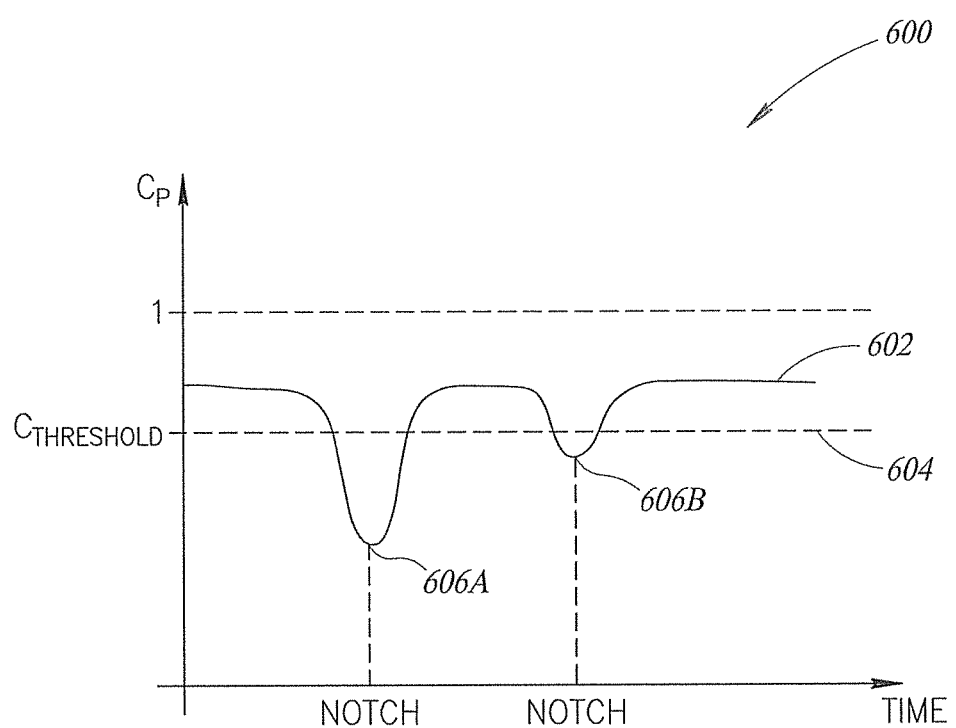
FIG. 6 is a graph of a correlation function versus time for a notch detector executing on the mobile processor-based device of the location estimation system, according to one illustrated implementation.

As discussed further below, a correlation function between a trend (or running average) of the RSSI for the first beacon and a trend of the RSSI for the second beacon may be evaluated to determine whether one or both of the RSSIs is irregular. Such irregularity may be presented as a negative notch in the correlation function, as shown in FIG. 6. If the correlation value is below a correlation threshold value (e.g., 0.75), at least one of the two beacon signals is irregular. Responsive to detecting that one or both of the signals is irregular, the mobile processor-based device may determine which signal of the two signals is regular and may use only the RSSI of that regular signal to estimate the distance between the mobile processor-based device and the beacon system. Advantageously, the use of two or more beacons in diversity mode attenuates the effect of multipath fading by transmitting a redundant amount of information. In other words, the different behaviors of the two or more correlated beacon signals are used to produce a correlation function and are used to evaluate the diverging behavior situations.

FIG. 1 illustrates an example environment for a location estimation system 100 which includes a multi-beacon system 102 and one or more mobile processor-based devices 104A and 104B, collectively mobile processor-based devices 104. As discussed in detail below, in operation one or more processors of the mobile processor-based devices 104 estimates a distance or "range" to the multi-beacon system 102 by receiving and processing signals from the multi-beacon system 102. The environment may be an outdoor environment, such as a sidewalk, or may be an indoor environment, such as a building (e.g., retail store, shopping center), or may be a combination of outdoor and indoor environments. In addition to walls and a ceiling, the environment of the location estimation system 100 may include various furniture, structures, customers and other objects that can reflect RF signals emitted by the beacons 108, causing multipath interference at an RF receiver (or transceiver) of the mobile processor-based devices 104. The mobile processor-based devices 104 may be custom shopping devices, smartphones, navigation devices, wearable computers (e.g., wristwatch), tablet computers, or any other devices capable of receiving RF signals.

The multi-beacon system 102 may include a support structure or housing 106, a first beacon 108A and a second beacon 108B, collectively beacons 108. The first beacon 108A and the second beacon 108B are spaced apart from each other by a distance (d) which is equal to or greater than a maximum wavelength (1 of the beacon signals emitted by the beacons and less than or equal to four times the maximum wavelength of the beacon signals. The multi-beacon system 102 is discussed further below with reference to FIG. 3.

The mobile processor-based devices 104 may estimate distance using RF signal measurements obtained from RF signals transmitted from the first and second beacons 108A and 108B (e.g., beacon transmissions) of the multi-beacon system 102. One example of an RF signal measurement is a received signal strength indicator (RSSI), which is an indication of the power level being received by an antenna.

As shown in FIG. 1, the mobile processor-based devices 104 may communicate with other processor-based systems over one or more wired and/or wireless networks 110. As an example, the mobile processor-based device 104B may connect to a wireless network 112, such as a cellular network, which may communicate with a wide area network 114 (e.g., Internet) via a gateway 116. Similarly, the mobile processor-based device 104A may communicate with an access point 118 which provides communication access to the wide area network 114. In some implementations, both voice and data communications may be established over the wired/wireless networks 110. The mobile processor-based devices 104 may also establish peer-to-peer communications with each other by use of one or more wired and/or wireless communication subsystems. Other communication protocols and topologies may also be implemented.

In some implementations, the mobile processor-based devices 104 may communicate with one or more services 120 over the one or more wired and/or wireless networks 110. For example, the one or more services 120 may provide location based navigation information, promotional information, or other location based information to the mobile processor-based devices 104. The one or more services 120 may be associated with particular retail stores or retail store chains, particular brands, or any other entity or entities.

Figure 2:
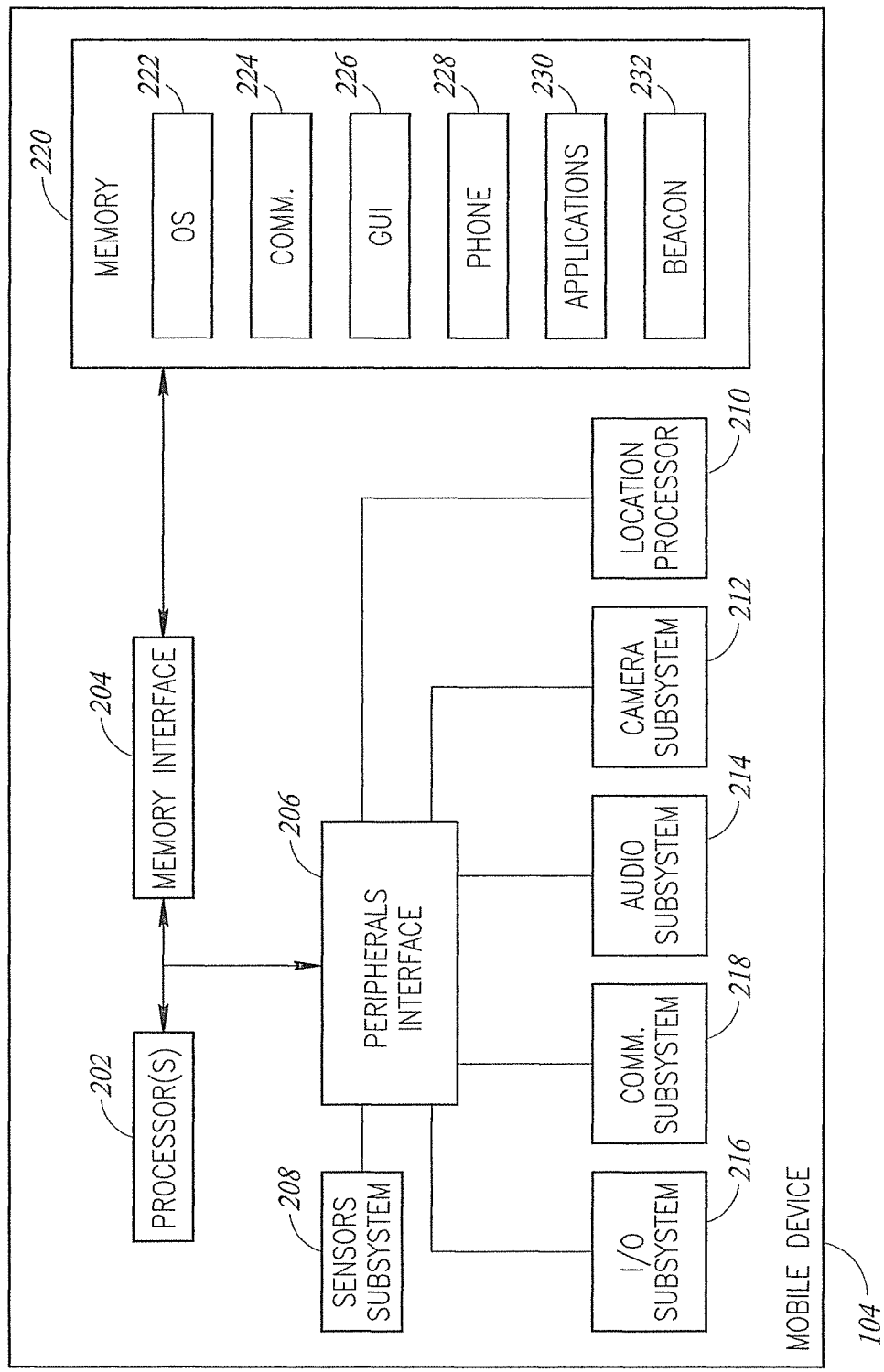
FIG. 2 is a schematic block diagram of an architecture for the mobile processor-based device of the location estimation system, according to one illustrated implementation.

FIG. 2 shows an example architecture for the mobile processor-based devices 104. The mobile processor-based device 104 may include one or more processors 202, a memory interface 204 and a peripherals interface 206, which may be separate components or may be integrated in one or more integrated circuits. One or more communication buses or signal lines may couple the various components.

As shown, various sensors, devices, and subsystems may be coupled to peripherals interface 206 to facilitate multiple functionalities. For example, a sensor subsystem 208 may be coupled to the peripherals interface 206. The sensor subsystem 208 may include, for example, a motion sensor, light sensor, proximity sensor, temperature sensor, biometric sensor, or other sensing device, to facilitate related functionalities.

The mobile processor-based device may also include a location processor 210 (e.g., GPS receiver, Wi-Fi® baseband processor) operatively coupled to the peripherals interface 206 to provide geo-positioning. The mobile processor-based device 104 may also include a camera subsystem 212 to facilitate camera functions, such as capturing photographs and videos.

The mobile processor-based device 104 may also include an audio subsystem 214 which may include one or more speakers and one or more microphones to facilitate voice-enabled functions, such as voice recognition, voice replication, digital recording, and telephony functions.

An I/O subsystem 216 of the mobile processor-based device 104 may include a touch controller and/or other input controllers. The touch controller may be coupled to a touch surface to detect contact and movement using any of a number of touch sensitivity technologies, including but not limited to capacitive, resistive, infrared, and surface acoustic wave technologies. The I/O subsystem 216 may include other input controller(s) which may be coupled to other input/control devices, such as one or more buttons, rocker switches, thumb-wheel, infrared port, USB port, and/or a pointer device such as a stylus.

Communication and ranging functions may be facilitated through one or more communication subsystems 218. The communication subsystem 218 may include one or more wireless communication subsystems. Wireless communication subsystems may include RF receivers and transmitters and/or optical (e.g., infrared) receivers and transmitters. Wired communication subsystems may include port devices, such as a Universal Serial Bus (USB) port or other wired port connection that may be used to establish a wired connection to other computing devices. The specific design and implementation of the communication subsystem 218 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi®), code division multiple access (CDMA) networks, NFC networks, Bluetooth® networks, and/or Bluetooth® Low Energy (BLE) networks.

The memory interface 204 may be operatively coupled to memory 220, which may include high-speed random access memory or non-volatile memory, such as one or more magnetic disk storage devices, one or more optical storage devices, or flash memory. The memory 220 may store an operating system (OS) 222, which may include instructions for handling basic system services and for performing hardware dependent tasks.

The memory 220 may also store communication instructions 224 to facilitate communicating with one or more devices or one or more computers or servers. The memory 220 may also include graphical user interface (GUI) instructions 226 to facilitate graphic user interface processing, including a touch model for interpreting touch inputs and gestures, and phone instructions 228 to facilitate phone-related processes and functions.

The memory 220 may also store applications 230 which facilitate various functionality, such as electronic messaging, web browsing, media processing, navigation, etc. The memory 220 may also store beacon processing instructions or application 232 which may facilitate the various functionality described herein with reference to FIGS. 1-8. The functionality of the beacon processing application 232 may be separate from or integrated with one or more other applications 230.

As an example, the beacon processing application 232 may run in the background on the mobile processor-based device 104 and may become active only when one or more radio signals having a unique identifier associated with the beacon application 232 or another application 230 (e.g., retail store application) is received. For example, a user of the mobile processor-based device 104 may download a software application from an "app store" which is associated with a specific retail store or retail store chain. The software application may be loaded onto the memory 220 of the mobile processor-based device and may include information about universally unique identifiers (UUIDs) used by the store or the store chain. The software application may monitor the various UUIDs received by the mobile processor-based device 104 and may determine when the mobile processor-based device is receiving one or more UUIDs associated with the retail store or retail store chain. The software application may then determine a location using one or more of the techniques disclosed herein.

Figure 3:
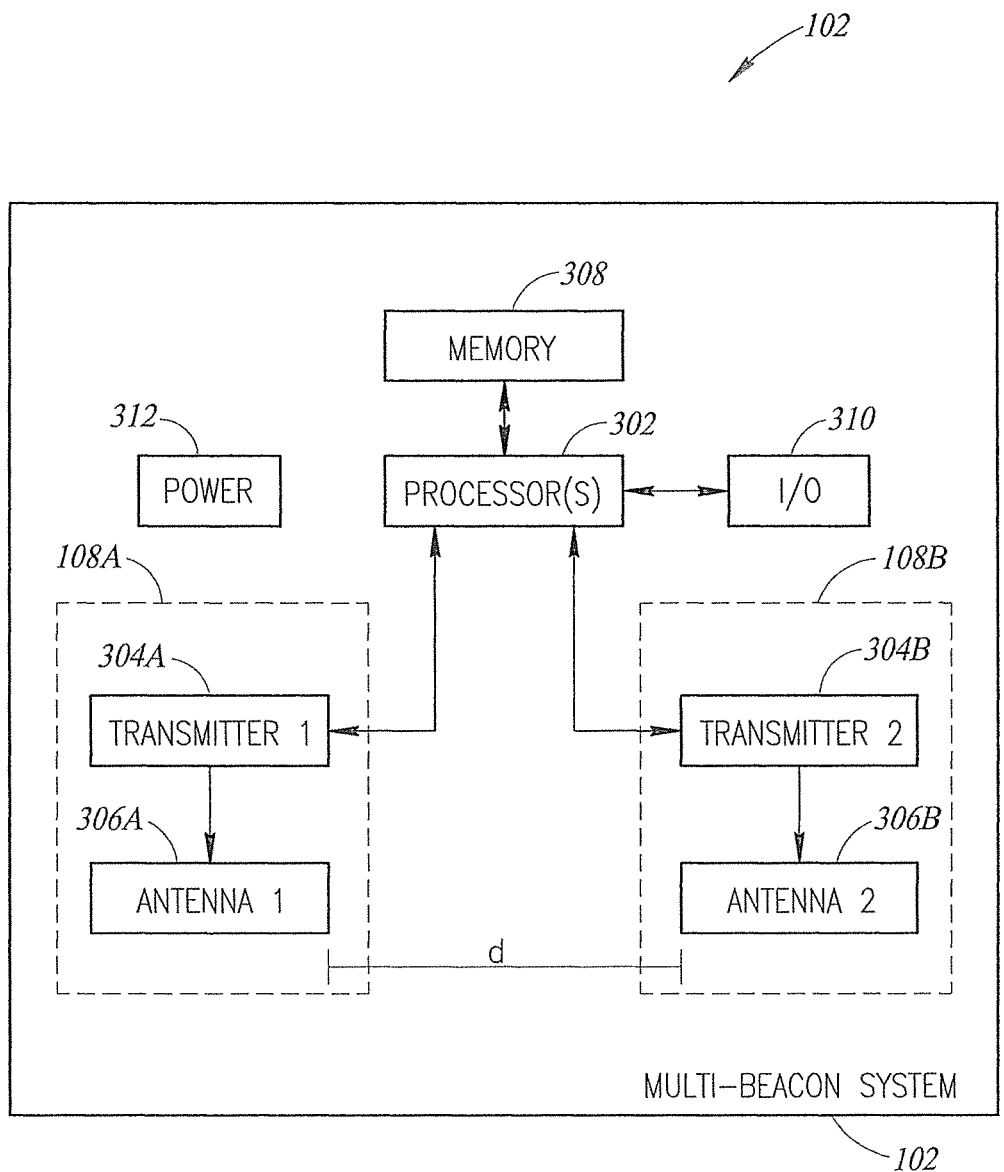
FIG. 3 is a schematic block diagram of the multi-beacon system of the location estimation system, according to one illustrated implementation.

Referring to FIGS. 1 and 3, the housing or support structure 106 of the multi-beacon system 102 may include any number or type of housing, structure, support, frame, platform, and/or mechanical apparatus for supporting the beacons 108A and 108B in a fixed relationship spaced apart by the distance (d). The housing 106 may enclose the beacons 108A, 108B or may leave one or both of the beacons exposed. The housing 106 is illustrated as a single piece but may comprise multiple pieces, and may have various shapes. For example, the housing 106 may comprise two completely separate housings which each support one of the beacons 108A and 108B and their respective beacon components (e.g., processor, memory, transmitter, power, I/O, other). The housing 106 may also include features for mounting to another device or surface, such as a wall or ceiling, for example.

As shown in FIG. 3, the multi-beacon system 102 may also include one or more processors 302 communicatively coupled to transmitters 304A and 304B of the beacons 108A and 108B, respectively. The transmitters 304A and 304B may be operatively coupled to respective antennas 306A and 306B which emit the RF beacon signals.

The processor 302 may be operatively coupled to a memory 308 which stores at least one of instructions or data, and an I/O subsystem 310 which facilitates various input/output functions and/or wired or wireless communications. The multi-beacon system 102 may also include other components such as power components 312 (e.g., power interface, power supply, battery), an electromechanical interface, an audible indicator, a visual indicator, a fan, a switch, and/or a user interface.

The beacons 108A and 108B may also include other components such as an amplifier, a modulator, a signal generator, a multiplier, a switch, a filter, an attenuator, a combiner, a power measurement device, an oscillator, a crystal, and/or other electrical components, either analog or digital.

Each of the beacons 108A and 108B may be a separate, independent assembly or may be included in a single assembly. In at least some implementations, the beacons 108A and 108B may share one or more components. In addition, any of the components in the multi-beacon system 102 may share one or more subcomponents or subassemblies, and any of the components may be implemented using separate subcomponents. For example, in some implementations the multi-beacon system 102 may include two (or more) fully independent beacons which each include the various beacon components (e.g., housing, processor, memory, transmitter, power components (e.g., battery), I/O components, other components). In such instances, the two or more independent beacons may be fixedly positioned (e.g., mounted) at a fixed distance (d) from each other. In some implementations, the multi-beacon system 102 may have more than the two beacons 108A and 108B illustrated in FIGS. 1 and 3.

The signals transmitted by the beacons 108A and 108B may be orthogonal such that the signals may be transmitted simultaneously using a same frequency range yet still distinguished from each other by the receiving mobile processor-based device 104. As noted above, the beacon messages of the beacon signals emitted by the beacons 108A and 108B may be intrinsically correlated. For example, the respective beacon frames emitted by the beacons 108A and 108B may be implemented as odd data and even data. Further, the beacons 108A and 108B may emit the beacon signals on different channels to ensure that the receiving mobile processor-based device receives the signals independently without interference from each other.

In operation, the mobile processor-based device 104 receives the two correlated signals concurrently transmitted by the beacons 108A and 108E and determines a received signal strength associated with each of the signals. Because the signals each contain a unique identifier, the mobile processor-based device 104 is able to discern one signal from another. As discussed further below, the mobile processor-based device 104 may then use the determined received signal strength measurements to estimate the distance between the mobile processor-based device and the multi-beacon system 102.

The transmitters 304A and 304B of the beacons 108A and 108B, respectively, may transmit or emit a wide variety of types of signals in accordance with the techniques and methods described herein. In one example, the transmitters 304A and 304B comprise Bluetooth® or Bluetooth® Low Energy (BLE) transmitter modules. In some configurations, BLE may provide unique benefits. In one example, the lower power requirement of BLE may enable the beacons 108A and 108B to be powered by a battery for a relatively longer period of time. In addition, on some mobile processor-based devices 104, the RSSI for received BLE signals may be more readily accessible to the device or software applications than is the RSSI for other types of received radio signals, such as Wi-Fi®. However, it should be understood that the apparatuses, methods, and techniques disclosed herein may be implemented using transmitters and/or radio signals of various types and are not to be limited to Bluetooth® or BLE. In some examples, the apparatuses, methods, and techniques disclosed herein may be implemented using Wi-Fi® signals or other types of signals. The apparatuses, methods, and techniques disclosed herein may also be implemented using a combination of signal types, signal formats, signal protocols, and/or modulation techniques.

In the case of BLE, each of the beacons 108A and 108B may transmit on one of three BLE advertising channels which fall in the 2.4 GHz ISM band. The three advertising channels, channels 37, 38, and 39 from the Bluetooth® 4.0 protocol, correspond to frequencies 2402 MHz, 2426 MHz, and 2480 MHz, respectively, which produces signals having wavelengths of 12.5 cm, 12.4 cm, and 12.1 cm, respectively.

In one or more implementations, BLE beacons may be operated in what is known as the BLE Proximity Profile, in which data is broadcast one-way, from each BLE transmitter outwards on one of these three channels. The data payload may include a unique identifier for the transmitter, such as a Universally Unique Identifier (UUID). The unique identifier may be used by a receiving device to distinguish the signals from each other, to distinguish one beacon from another, to determine an identity associated with the beacon, and/or for other purposes. In addition, the transmission may include information indicating the transmit power of the signal. In some cases, the transmit power is an RSSI, as discussed above. The unique identifier, the transmit power, and/or any other information included in the signal may be modulated or encoded using one or more of any known modulation or encoding techniques.

Figure 4:
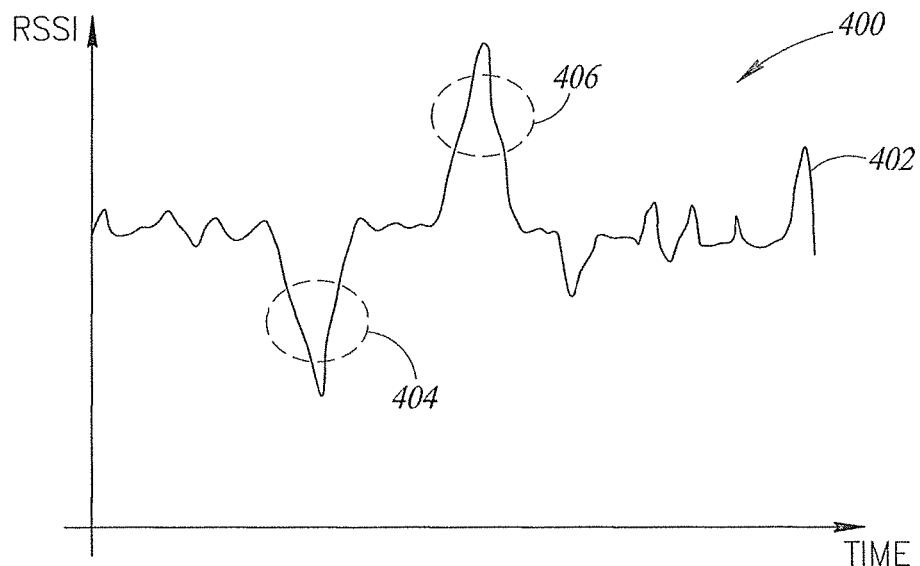
FIG. 4 is a graph of a received signal strength indicator acquired by a receiver of the mobile processor-based device from a beacon of the multi-beacon system, according to one illustrated implementation.

FIG. 4 shows a graph 400 of an RSSI signal 402 acquired by mobile processor-based device as a function of time. As shown, the RSSI signal 402 may be a very noisy signal which includes the frequent presence of negative notches 404 and positive notches 406 caused by multipath effects. Without the techniques of the present disclosure, the mobile processor-based device may erroneously interpret the negative notches 404 as an instantaneous increase in the distance between the beacon and the mobile processor-based device. Similarly, the mobile processor-based device may erroneously interpret the positive notches 406 as an instantaneous increase in the distance between the beacon and the mobile processor-based device.

Figure 5:
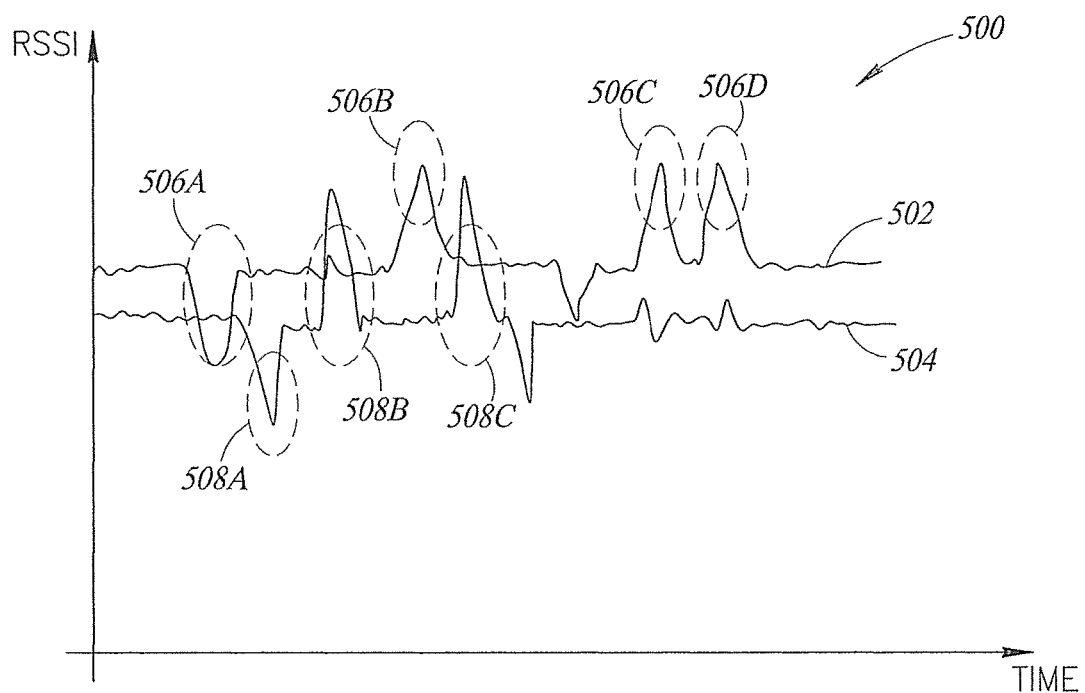
FIG. 5 is a graph of two received signal strength indicators acquired from the receiver of the mobile processor-based device from two beacons of the multi-beacon system, according to one illustrated implementation.

FIG. 5 shows a graph 500 of a first RSSI signal 502 and a second RSSI signal 504 acquired by a mobile processor-based device as a function of time. For instance, the first RSSI signal 502 may be received by the mobile processor-based device from the first beacon 108A (FIG. 1) of the multi-beacon system 102, and the second RSSI signal 504 may be received from the second beacon 108B of the multi-beacon system.

As shown in the graph 500 of FIG. 5, the first RSSI signal 502 and the second RSSI signal 504 are largely similar or correlated, as discussed above. However, due to the aforementioned multipath effects, the first RSSI signal 502 includes a number of positive and negative notches 506A-506D. Similarly, the second RSSI signal 504 includes a number of positive and negative notches 508A-508C. At points in time where one or both of the first and second RSSI signals 502 and 504, respectively, are irregular (e.g., positive or negative notches), it may be undesirable to utilize such signals to estimate distance since irregular signals are not indicative of the actual distance between the mobile processor-based device and the multi-beacon system but rather are artifacts of multipath errors. Thus, the at least one processor of the mobile processor-based device may ignore or at least de-weight irregular RSSI signals, which significantly improves the accuracy and precision of the distance estimation calculations.

FIG. 6 shows a graph 600 of a normalized correlation function 602 as a function of time. The correlation function 602 may correlate the trend of the first RSSI signal 502 received from the first beacon 108A with the trend of the second RSSI signal 504 received from the second beacon 108B. The correlation function 602 may be compared to a correlation threshold value 604. As a non-limiting example, the correlation threshold value 604 may be 0.75 (perfect correlation equals 1).

As shown, the correlation function 602 is normally above the correlation threshold value 604, but drops below the correlation threshold value at notches 606A and 606B, which indicates that at least one of the first and second RSSI signals is irregular (e.g., due to multipath effects). As discussed below, by detecting notches in the correlation function, the at least one processor of the mobile processor-based device can modify the distance estimation algorithm to compensate for the irregular RSSI signals so the irregular RSSI signals do not reduce the accuracy of the overall distance estimation calculations.

Figure 7:
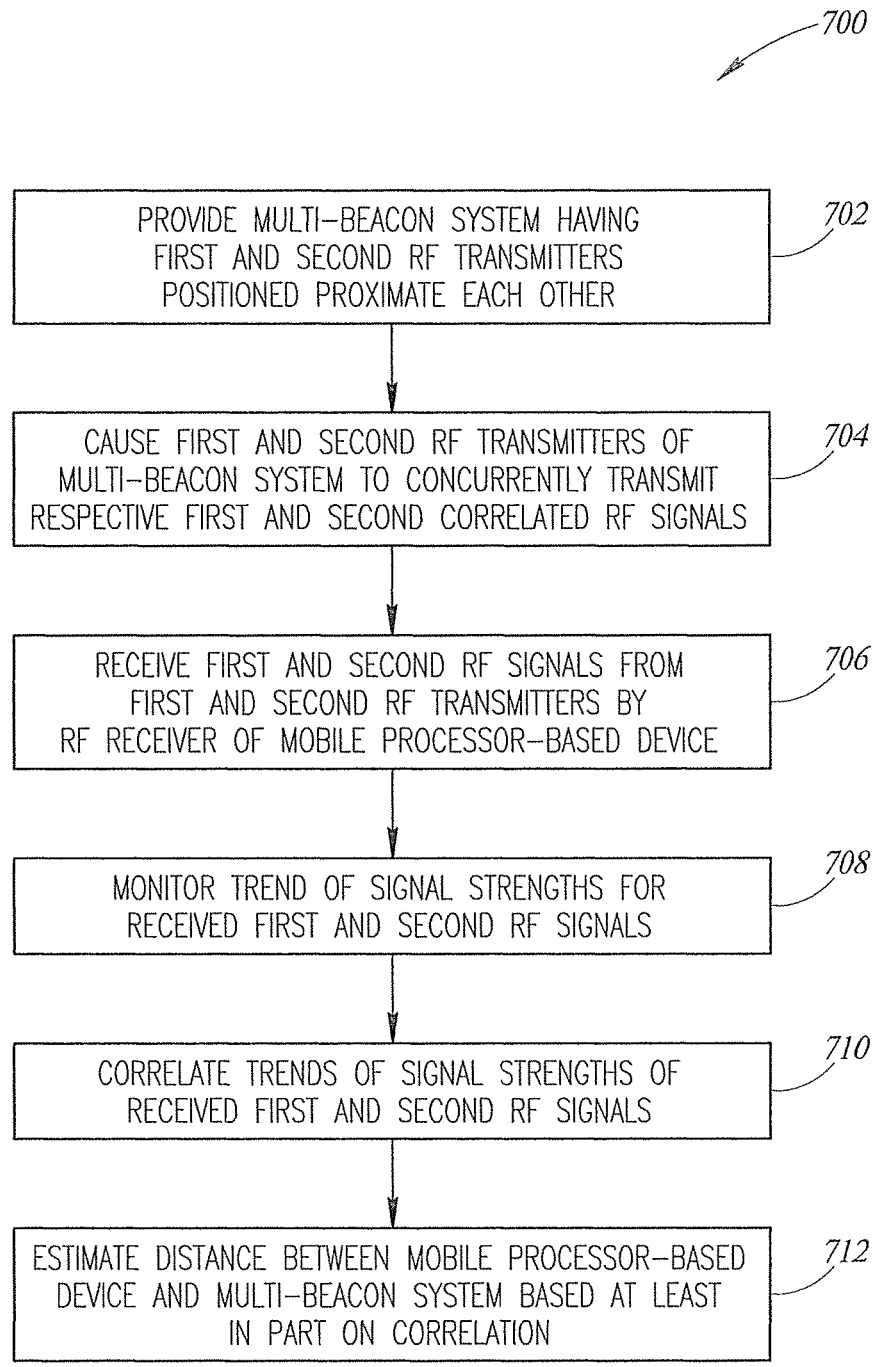
FIG. 7 is a flow diagram of a method of operating a location estimation system to estimate a range between a multi-beacon system and a mobile processor-based device, according to one illustrated implementation.

FIG. 7 shows a method 700 of operation for a location estimation system for facilitating location estimation of a mobile processor-based device. At 702, the method 700 may include providing a multi-beacon system having first and second RF transmitters positioned proximate each other and spaced apart by a fixed distance. For example, the first and second RF transmitters may be spaced apart from each other by a distance that is between one and four times of a maximum wavelength ($\lambda_{max}$) of the RF signals transmitted by the first and second RF transmitters during a distance estimation operation (e.g., between 12.5 cm and 50 cm for a 2.4 GHz signal, between 25.0 cm and 35.0 cm for a 2.4 GHz signal). The multi-beacon system may be similar or identical to the multi-beacon system 102 of FIGS. 1 and 3 discussed above.

At 704, at least one processor of the multi-beacon system may cause each of the first and second RF transmitters to concurrently transmit respective first and second RF signals. Each of the first and second RF signals may be modulated to permit the mobile processor-based device to receive each of the first and second RF signals independently without interference from one another. As discussed above, the at least one processor of the multi-beacon system may cause each of the first and second RF transmitters to transmit each of the respective first and second RF signals using an advertising mode of a wireless communications protocol (e.g., BLE). The at least one processor of the multi-beacon system may cause each of the first and second RF transmitters to transmit the first and second RF signals, respectively, on different channels (e.g., BLE advertising channels 37 and 38). In some implementations, each of the first and second RF signals may be modulated to encode at least a unique identifier and signal strength information.

At 706, at least one processor of a mobile processor-based device positioned proximate the multi-beacon system may receive, via a RF receiver or transceiver, the first and second RF signals emitted from the respective first and second RF transmitters of the multi-beacon system. At 708, the at least one processor of the mobile processor-based device may monitor a trend (e.g., running average) of signal strengths (e.g., RSSI) for each of the received first and second RF signals. At 710, the at least one processor of the mobile processor-based device may correlate the trends of the signal strengths of the received first and second RF signals using a correlation function, as discussed above with reference to FIG. 6.

At 712, the at least one processor of the mobile processor-based device may estimate a distance between the mobile processor-based device and the multi-beacon system based at least in part on the correlation of the trends of the signal strengths of the received first and second RF signals.

As an example, responsive to determining the correlation value is greater than a correlation threshold value (e.g., 0.75), the at least one processor of the mobile processor-based device may estimate the distance between the mobile processor-based device and the multi-beacon system based at least in part on one of: the trend of RSSI signals for the received first RF signal, the trend of RSSI signals for the received second RF signal, an average of the trend of RSSI signals for the received first RF signal and the trend of RSSI signals for the received second RF signal, or a median of the trend of RSSI signals for the received first RF signal and the trend of RSSI signals for the received second RF signal.

Responsive to the correlation being less than the correlation threshold value, the at least one processor of the mobile processor-based device may determine which of the received first and second RF signals causes the correlation to be less than the correlation threshold value. For example, the at least one processor of the mobile processor-based device may look at a running average of the first and second RSSI signals to determine which one (or both) of the RSSI signals is irregular due to multipath. Responsive to determining that an RSSI signal is irregular, the at least one processor of the mobile processor-based device may ignore or at least de-weight that irregular RSSI signal so that non-irregular RSSI signals are primarily or exclusively used to estimate the distance between the mobile processor-based device and the multi-beacon system.

Figure 8:
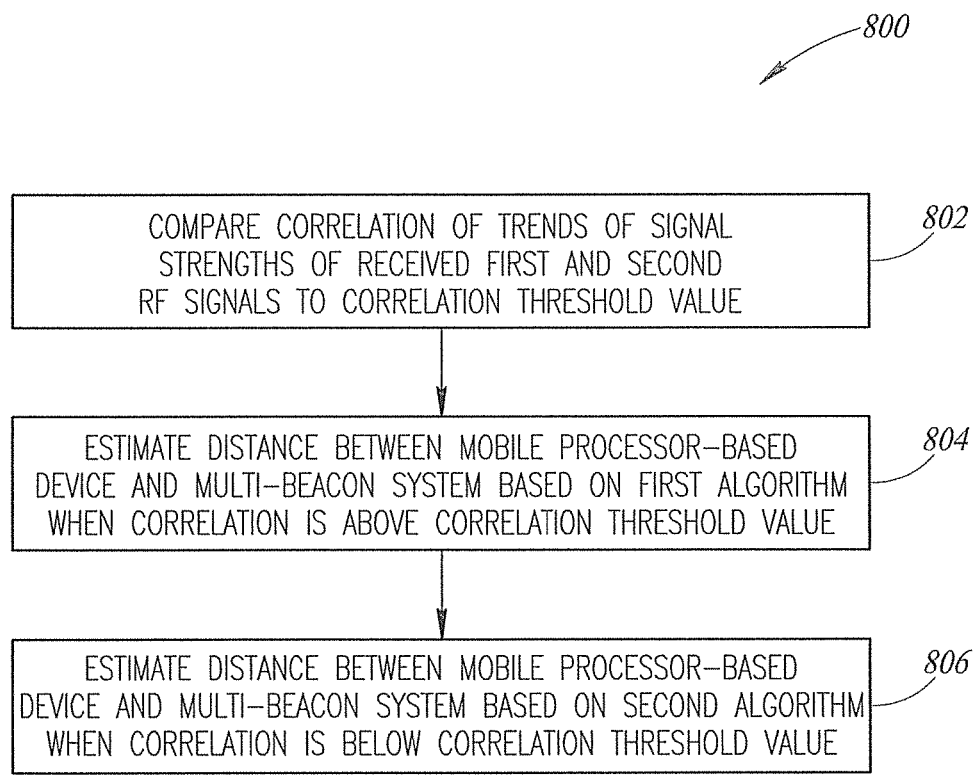
FIG. 8 is a flow diagram of a method of operating a location estimation system to estimate a range between a multi-beacon system and a mobile processor-based device by utilizing different estimation algorithms dependent on a correlation of trends of signal strengths of first and second received RF signals, according to one illustrated implementation.

FIG. 8 shows a method 800 of operating a location estimation system to estimate a range between a multi-beacon system and a mobile processor-based device by utilizing different estimation algorithms dependent on a correlation of trends of signal strengths of first and second received RF signals.

At 802, at least one processor of a mobile processor-based device, such as the mobile processor-based device 104 (FIG. 1), compares a correlation of trends of signal strengths of received first and second RF signals to a correlation threshold value. The first and second RF signals may be received from first and second beacons, respectively, of a multi-beacon system, such as the multi-beacon system 102 of FIGS. 1 and 3 discussed above.

At 804, the at least one processor of the mobile processor-based device may estimate a distance between the mobile processor-based device and the multi-beacon system based on a first algorithm when the correlation is above the correlation threshold value. For example, when the correlation is above the correlation threshold value, the at least one processor of the mobile processor-based device may estimate the distance using RSSI signals for the first RF signal, RSSI signals for the second. RF signal, or an average or median of the RSSI signals for the first and second RF signals.

At 806, the at least one processor of the mobile processor-based device may estimate a distance between the mobile processor-based device and the multi-beacon system based on a second algorithm different than the first algorithm when the correlation is below the correlation threshold value. As discussed above, a low correlation value is indicative of at least one of the RSSI signals being irregular due to multipath or other effects. Thus, upon detection of the low correlation, the at least one processor of the mobile processor-based device may modify the distance estimation algorithm to minimize or eliminate the effect that the irregular RSSI signal(s) has on the accuracy or precision of the distance estimation calculation.

In some implementations, the at least one processor of the mobile processor-based device may discard or ignore RSSI signals determined to be irregular based on the correlation value dropping below the correlation threshold value. In some implementations, the at least one processor may select one of the two RSSI signals for use in the distance calculation when the correlation is high, since in such cases either of the RSSI signals will provide an accurate distance estimation, and the at least one processor may take the average or median of the two RSSI signals for use in the distance calculation when the correlation is low to minimize the effect an irregular RSSI has on the distance estimation calculation.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A mobile processor-based device, comprising:
a radio frequency (RF) receiver;
at least one nontransitory processor-readable storage medium that stores at least one of processor-executable instructions or data; and
at least one processor communicably coupled to the at least one nontransitory processor-readable storage medium and communicatively coupled to the RF receiver, in operation the at least one processor:
receives, via the RF receiver, a first RF signal from a first RF transmitter of a multi-beacon system, the first RF signal having a wavelength between a minimum wavelength and a maximum wavelength;
receives, via the RF receiver, a second RF signal from a second RF transmitter of the multi-beacon system, the second RF signal having a wavelength between the minimum wavelength and the maximum wavelength, the second RF transmitter spaced apart from the first RF transmitter by a distance which is equal to or greater than the maximum wavelength and less than or equal to four times the maximum wavelength, the first and second signals received concurrently from the respective first and second RF transmitters, and each of the first and second RF signals modulated to allow the RF receiver to receive each of the first and second RF signals without interference from one another;
monitors a trend of signal strengths for each of the received first and second RF signals;
correlates the trends of the signal strengths of the received first and second RF signals; and
estimates a distance between the mobile processor-based device and the multi-beacon system based at least in part on the correlation of the trends of the signal strengths of the received first and second RF signals, wherein the distance is estimated differently at instances when the determined correlation is greater than a predetermined correlation threshold value than at instances when the determined correlation is less than the predetermined correlation threshold value including ignoring or de-weighting signal strengths from the respective trend of signal strengths for the first and second RF signals for any positive notches or negative notches in the trends causing the correlation to be less than the correlation threshold value.

2. The mobile processor-based device of claim 1 wherein, responsive to the correlation being greater than a correlation threshold value, the at least one processor of the mobile processor-based device estimates a distance between the mobile processor-based device and the multi-beacon system based at least in part on one of: the trend of signal strengths for the received first RF signal, the trend of signal strengths for the received second RF signal, an average of the trend of signal strengths for the received first RF signal and the trend of signal strengths for the received second RF signal, or a median of the trend of signal strengths for the received first RF signal and the trend of signal strengths for the received second RF signal.

3. The mobile processor-based device of claim 2 wherein, responsive to the correlation being less than the correlation threshold value, the at least one processor of the mobile processor-based device determines which of the received first and second RF signals causes the correlation to be less than the correlation threshold value, and responsive to the determination, ignores signal strengths determined to cause the correlation to be less than the correlation threshold value from the respective trend of signal strengths for the first and second RF signals.

4. The mobile processor-based device of claim 1 wherein, responsive to the correlation being less than a correlation threshold value, the at least one processor of the mobile processor-based device determines which of the received first and second RF signals causes the correlation to be less than the correlation threshold value, and responsive to the determination, de-weights signal strengths determined to cause the correlation to be less than the correlation threshold value from the respective trend of signal strengths for the first and second RF signals.

5. The mobile processor-based device of claim 1 wherein the at least one processor of the mobile processor-based device monitors a trend of received signal strength indicators (RSSIs) for each of the received first and second RF signals.

6. The mobile processor-based device of claim 1 wherein the at least one processor of the mobile processor-based device monitors a trend of signal strengths for each of the received first and second RF signals, each of the trends of signal strengths comprising a running average of a plurality of signal strengths.

7. A multi-beacon system, comprising:
a first radio frequency (RF) transmitter which transmits RF signals having wavelengths between a minimum wavelength and a maximum wavelength;
a second RF transmitter which transmits RF signals having wavelengths between the minimum wavelength and the maximum wavelength, the second RF transmitter spaced apart from the first RF transmitter by a distance which is equal to or greater than the maximum wavelength and less than or equal to four times the maximum wavelength;
at least one nontransitory processor-readable storage medium that stores at least one of processor-executable instructions or data; and
at least one processor communicably coupled to the at least one nontransitory processor-readable storage medium and communicatively coupled to the first and second RF transmitters, in operation the at least one processor;
causes each of the first and second RF transmitters to concurrently transmit respective first and second RF signals, each of the first and second RF signals modulated to permit at least one processor of a mobile processor-based device to receive each of the first and second RF signals independently without interference from one another, and the transmission of the first and second RF signals causes at least one processor of a mobile processor device located proximate to the multi-beacon system to correlate trends of the signal strengths of the received first and second RF signals to estimate a distance between the mobile processor-based device and the multi-beacon system, wherein the distance is estimated differently at instances when the determined correlation is greater than a predetermined correlation threshold value than at instances when the determined correlation is less than the predetermined correlation threshold value including ignoring or de-weighting signal strengths from the respective trend of signal strengths for the first and second RF signals for any positive notches or negative notches in the trends causing the correlation to be less than the correlation threshold value.

8. The multi-beacon system of claim 7 wherein the multi-beacon system comprises first and second independent beacons, the first RF transmitter is an RF transmitter of the first independent beacon having a first nontransitory processor-readable storage medium and a first processor communicatively coupled to the first nontransitory processor-readable medium and the first RF transmitter, and the second RF transmitter is an RF transmitter of the second independent beacon having a second nontransitory processor-readable storage medium and a second processor communicatively coupled to the second nontransitory processor-readable medium and the second RF transmitter.

9. The multi-beacon system of claim 7 wherein the maximum wavelength is 12.5 centimeters, and the second RF transmitter spaced apart from the first RF transmitter by a distance which is equal to or greater than 12.5 centimeters and less than or equal to 50 centimeters.

10. The multi-beacon system of claim 7 wherein the maximum wavelength is 12.5 centimeters, and the second RF transmitter spaced apart from the first RF transmitter by a distance which is equal to or greater than 25 centimeters and less than or equal to 35 centimeters.

11. The multi-beacon system of claim 7 wherein the at least one processor of the multi-beacon system causes each of the first and second RF transmitters to transmit each of the respective first and second RF signals using an advertising mode of a wireless communications protocol.

12. The multi-beacon system of claim 7 wherein the at least one processor of the multi-beacon system causes the first RF transmitter to transmit the first RF signal on a first channel of a wireless communications protocol and causes the second RF transmitter to transmit the second RF signal on a second channel of the wireless communications protocol, the second channel different from the first channel.

13. The multi-beacon system of claim 7 wherein the at least one processor of the multi-beacon system causes the first RF transmitter to transmit the first RF signal which is implemented as odd data and causes the second RF transmitter to transmit the second RF signal which is implemented as even data.

14. The multi-beacon system of claim 7 wherein the multi-beacon system comprises a support structure which physically supports the first RF transmitter and the second RF transmitter.

15. The multi-beacon system of claim 7 wherein the multi-beacon system comprises a first support structure which physically supports the first RF transmitter, and a second support structure which physically supports the second RF transmitter.

16. The multi-beacon system of claim 7 wherein each of the first and second RF signals is modulated to include unique identifying information and signal strength information.

17. A location estimation system for facilitating location estimation of a mobile processor-based device, the location estimation system comprising:
a multi-beacon system, comprising:
a first radio frequency (RF) transmitter which transmits RF signals having wavelengths between a minimum wavelength and a maximum wavelength;
a second RF transmitter which transmits RF signals having wavelengths between the minimum wavelength and the maximum wavelength, the second RF transmitter being spaced apart from the first RF transmitter by a distance which is equal to or greater than the maximum wavelength and less than or equal to four times the maximum wavelength;
at least one nontransitory processor-readable storage medium that stores at least one of processor-executable instructions or data; and
at least one processor communicably coupled to the at least one nontransitory processor-readable storage medium and communicatively coupled to the first and second RF transmitters, in operation the at least one processor:
causes each of the first and second RF transmitters to concurrently transmit respective first and second RF signals, each of the first and second RF signals modulated to permit a mobile processor-based device to receive each of the first and second RF signals independently without interference from one another; and
a mobile processor-based device, comprising:
an RF receiver;
at least one nontransitory processor-readable storage medium that stores at least one of processor-executable instructions or data; and at least one processor communicably coupled to the at least one nontransitory processor-readable storage medium and communicatively coupled to the RF receiver, in operation the at least one processor:
receives, via the RF receiver, the first and second RF signals from the respective first and second RF transmitters of the multi-beacon system;
monitors a trend of signal strengths for each of the received first and second RF signals;
correlates the trends of the signal strengths of the received first and second RF signals by evaluating a correlation function between trends of the first and second RF signals; and
estimates a distance between the mobile processor-based device and the multi-beacon system based at least in part on the correlation of the trends of the signal strengths of the received first and second RF signals, wherein the distance is estimated differently at instances when the determined correlation is greater than a predetermined correlation threshold value than at instances when the determined correlation is less than the predetermined correlation threshold value including ignoring or de-weighting signal strengths from the respective trend of signal strengths for the first and second RF signals for any positive notches or negative notches in the trends causing the correlation to be less than the correlation threshold value.

18. The location estimation system of claim 17 wherein the multi-beacon system comprises first and second independent beacons, the first RF transmitter is an RF transmitter of the first independent beacon having a first nontransitory processor-readable storage medium and a first processor communicatively coupled to the first nontransitory processor-readable medium and the first RF transmitter, and the second RF transmitter is an RF transmitter of the second independent beacon having a second nontransitory processor-readable storage medium and a second processor communicatively coupled to the second nontransitory processor-readable medium and the second RF transmitter.

19. The location estimation system of claim 17 wherein, responsive to the correlation being greater than a correlation threshold value, the at least one processor of the mobile processor-based device estimates a distance between the mobile processor-based device and the multi-beacon system based at least in part on one of: the trend of signal strengths for the received first RF signal, the trend of signal strengths for the received second RF signal, an average of the trend of signal strengths for the received first RF signal and the trend of signal strengths for the received second RF signal, or a median of the trend of signal strengths for the received first RF signal and the trend of signal strengths for the received second RF signal.

20. The location estimation system of claim 19 wherein, responsive to the correlation being less than the correlation threshold value, the at least one processor of the mobile processor-based device determines which of the received first and second RF signals causes the correlation to be less than the correlation threshold value, and responsive to the determination, ignores signal strengths determined to cause the correlation to be less than the correlation threshold value from the respective trend of signal strengths for the first and second RF signals.

* * * * *